United States Patent [19]
Tanaka

[11] Patent Number: 5,151,563
[45] Date of Patent: Sep. 29, 1992

[54] REMOTE CONTROL SWITCH FOR POSTURE ADJUSTMENT OF AUTOMOTIVE MIRRORS

[75] Inventor: Morimasa Tanaka, Atsugi, Japan

[73] Assignee: Ichikoh Industries, Ltd., Tokyo, Japan

[21] Appl. No.: 826,667

[22] Filed: Jan. 29, 1992

Related U.S. Application Data

[63] Continuation of Ser. No. 530,572, May 30, 1990, abandoned.

[30] Foreign Application Priority Data

May 30, 1989 [JP] Japan .................................. 1-134560
Jul. 28, 1989 [JP] Japan .................................. 1-194257

[51] Int. Cl.⁵ ........................ H01H 9/00; H01H 25/04
[52] U.S. Cl. .................................. 200/6 A; 200/5 R;
200/16 C; 200/DIG. 29
[58] Field of Search ............... 200/5 R, 6 A, 16 C,
200/16 D, 18, DIG. 29, 277, 277.1, 277.2

[56] References Cited

U.S. PATENT DOCUMENTS

| | | | |
|---|---|---|---|
| 4,245,137 | 1/1981 | Hirai et al. | 200/4 |
| 4,698,463 | 10/1987 | Tanaka et al. | 200/5 R |
| 4,698,464 | 10/1987 | Tanaka et al. | 200/5 R |
| 4,816,662 | 3/1989 | Kyoden | 200/5 R |
| 4,937,402 | 6/1990 | Kyoden | 200/5 R |

Primary Examiner—J. R. Scott
Attorney, Agent, or Firm—Foley & Lardner

[57] ABSTRACT

In a remote control switch for posture adjustment of the automotive mirrors, there are disposed on a substrate that is fixed within a casing, a first group of fixed contacts for posture control of the lefthand mirror and a second group of fixed contacts for posture control of the righthand mirror. The fixed contacts forming the first group and those forming the second group being offset at a predetermined angle from each other. Two electrically conductive balls are spaced apart from each other and are electrically connected to each other to form a pair of moving contacts. The moving contacts are held by a rotary switching member with their positional relation fixed so as to roll on the substrate. An operating shaft is mounted pivotably and tiltably in the casing, and is normally forced in a direction perpendicular to the substrate so as to take the neutral position. Further, the operating shaft is operatively connected to the rotary switching member. As the operating shaft is pivoted about the axis thereof, the rotary switching member is rotated to select either the lefthand or righthand mirror, and when the operating shaft is tilted leftward, rightward, forward or backward the tilting of the mirror face about the vertical or horizontal axis is controlled.

11 Claims, 15 Drawing Sheets

FIG.14

| operation / wiring pattern | tilting | B(+) | B(−) | C(0) | Hl | Vl | Hr | Vr | energization direction | motor |
|---|---|---|---|---|---|---|---|---|---|---|
| CCW | leftward | Fl ○ | ○ Cl | ○ Bl | ○ Gl | | | | w1 | M1 |
| CCW | rightward | Br ○ | Gr ○ | ○ Cr | ○ Fr | | | | w2 | M1 |
| CCW | neutral | | | | | | | | | |
| CCW | forward or upward | Fu ○ | Cu ○ | ○ Bu | | ○ Gu | | | x1 | M2 |
| CCW | backward or downward | Bd ○ | Gd ○ | ○ Cd | | ○ Fd | | | x2 | M2 |
| CW | leftward | Al ○ | Dl ○ | ○ El | | | ○ Hl | | y1 | M3 |
| CW | rightward | Er ○ | Hr ○ | ○ Dr | | | ○ Ar | | y2 | M3 |
| CW | neutral | | | | | | | | | |
| CW | forward or upward | Au ○ | Du ○ | ○ Eu | | | | ○ Hu | z1 | M4 |
| CW | backward or downward | Ed ○ | Hd ○ | ○ Dd | | | | ○ Ad | z2 | M4 |

F I G. 16
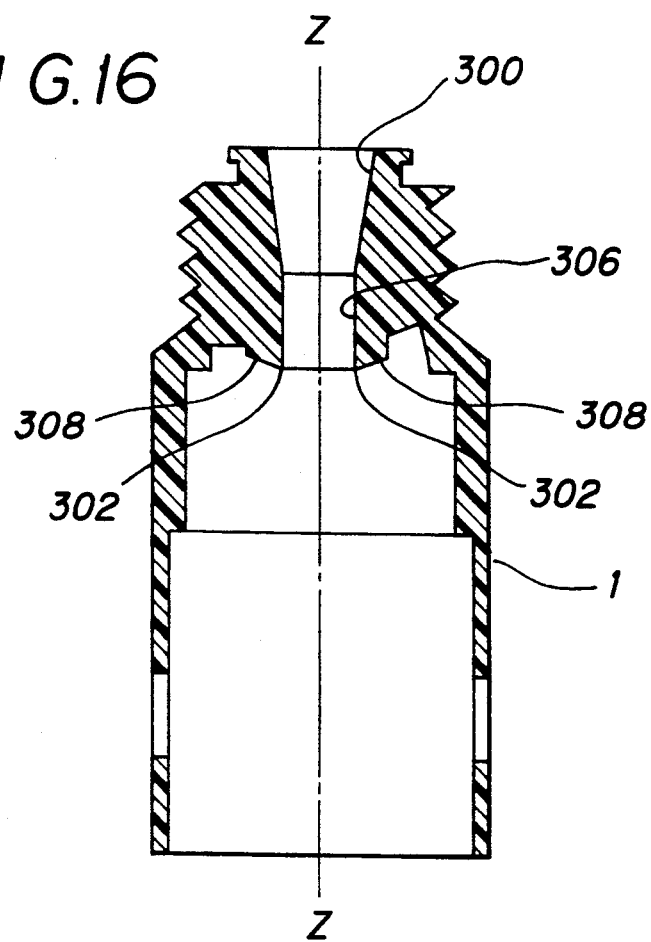
F I G. 17
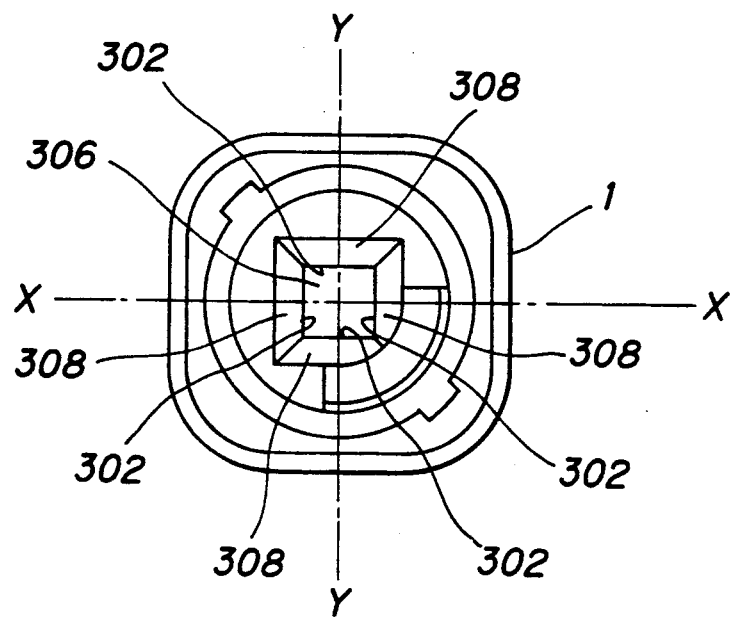

REMOTE CONTROL SWITCH FOR POSTURE ADJUSTMENT OF AUTOMOTIVE MIRRORS

This application is a continuation, of application Ser. No. 07/530,572, filed May 30, 1990, now abandoned.

BACKGROUND OF THE INVENTION a) Field of the Invention

The present invention relates to a remote control switch intended for use in posture adjustment of automotive mirrors.

b) Related Art Statement

The conventional control switches of this type disclosed, for example, in U.S. Pat. Nos. 4,698,463 and 4,698,464 (both issued on Oct. 6, 1987), comprise a plurality of fixed contacts disposed on a substrate, two sets of electrically conductive bridge-connected moving contacts disposed slidably on the substrate for electric connection between predetermined ones among these fixed contacts, and a push plate used for sliding these two sets of moving contacts on the substrate. In such a switch, however, since the bridge-connected moving contacts are slid on the substrate to electrically connect predetermined ones, to each other, among the fixed contacts, ample consideration has to be given to the wear and abrasion resistance of the moving and fixed contacts. Furthermore, since the operating member, for selection of the right or left which is to be adjusted, is provided independently from the push plate, the car driver has to operate separate operating members for selection of a right or left mirror, and for four-way posture control of the mirror surface of the mirror selected, respectively. This process during driving, is likely to be annoying and is not preferable for enhancing safe driving.

To overcome the disadvantages of the control switch using the above-mentioned electrically conductive bridge-connected moving contacts, a control switch is known from, for example, U.S. Pat. No. 4,816,662 (issued on Mar. 28, 1989), in which a plurality of electrically conductive ball-shaped moving contacts and a plurality of fixed contacts on a wiring pattern printed on a substrate (will be referred to as "PCB" hereafter) are electrically connected to each other by means of an operating shaft, a switching disk slidable by tilting the operating shaft, or a rotary cam rotatable by rotating the operating shaft through a predetermined angle, and a plurality of sliders each holding an actuating rod and the plurality of ball-like moving contacts, with the latter held in a rolling manner. In such a control switch, each actuating rod is formed integrally with the slider and when each actuating rod is pushed down by the switching disk or rotary cam, the pair of electrically conductive balls are slid on the PCB while being in contact with each other, thereby closing or opening the switch circuit for an intented control of mirror posture. In such a control switch, however, the plurality of fixed contacts are formed on both sides of the PCB, while the ball-like moving contacts are also disposed so as to roll correspondingly on both sides of the PCB. Further, the switching disk slides, or the rotary cam rotates, in a plane nearly perpendicularly to the PCB. Therefore, the energy transmission system is so complicated in structure that the tilting or rotation of the operating shaft cannot be converted directly to the rolling of the ball-like moving contacts. Along with the advancement in technical level of automotive electrical equipment, and the parts relevant to automobiles, the performance required of the control switches is correspondingly higher. Namely, it is required that the switching operating of the control switch should be more smooth, the whole structure of the control switch be more simplified, and the reliability of the switch operation be further improved.

SUMMARY OF THE INVENTION

The present invention has an object of providing an improved control switch that works smoothly and is simple.

According to another aspect of the present invention, an improved control switch is provided in which the tilting about the horizontal or vertical axis of the mirror surface of either of the two mirrors, right and left, can be controlled with the tilting and rotation of an operating shaft which can be operated more easily.

According to still another aspect of the present invention, a control switch is provided in which the operating shaft can be positively returned to the neutral position.

The above and other objects of the present invention will be apparent to those skilled in the art from reading the following detailed description of the disclosure found in the accompanying drawings.

BRIEF DESCRIPTION OF THE DRAWINGS

FIGS. 1 to 14 show one embodiment of the control switch according to the present invention, of which;

FIG. 1 is a longitudinal sectional view of the control switch;

FIG. 2 is an exploded perspective view of the control switch;

FIG. 3 is a schematic plan view of the control switch for explaining the rotating range of the operating shaft;

FIG. 4 is a sectional view, enlarged in scale, of the posture controller;

FIG. 5 is an exploded perspective view of the posture controller;

FIG. 6 is a bottom view of the rotary switching member holding four moving contacts;

FIG. 7 is a sectional view taken along the line VII—VII in FIG. 6;

FIG. 8 is a schematic exploded view of the posture controller;

FIG. 9 is a schematic view for explanation of the coupling mechanism for connection between the operating shaft and rotary switching member;

FIG. 10 is a schematic view for explanation of the layout of the fixed contact groups formed on the printed circuit board;

FIG. 11 is a schematic circuit diagram showing the wiring relation between the fixed contact groups formed on the PCB and the four motors;

FIG. 12 is a schematic circuit diagram for explanation of the rotation of the two motors for the lefthand mirror;

FIG. 13 is also a schematic circuit diagram for explanation of the rotation of the two motors for the righthand mirror;

FIG. 14 is a table for explanation of the operation of the circuits shown in FIGS. 12 and 13;

FIGS. 15 to 19 show another embodiment of the control switch according to the present invention, of which;

FIG. 15 is a longitudinal sectional view of the control switch;

FIG. 16 is a longitudinal sectional view of the casing;

FIG. 17 is a plan view of the casing;

FIG. 18 is a schematic diagram for explanation of the returning of the operating shaft to the neutral position; and FIG. 19 is a diagram for explanation of the operation of the control switch.

DETAILED DESCRIPTION OF THE PREFERRED EMBODIMENTS

Figure 1:
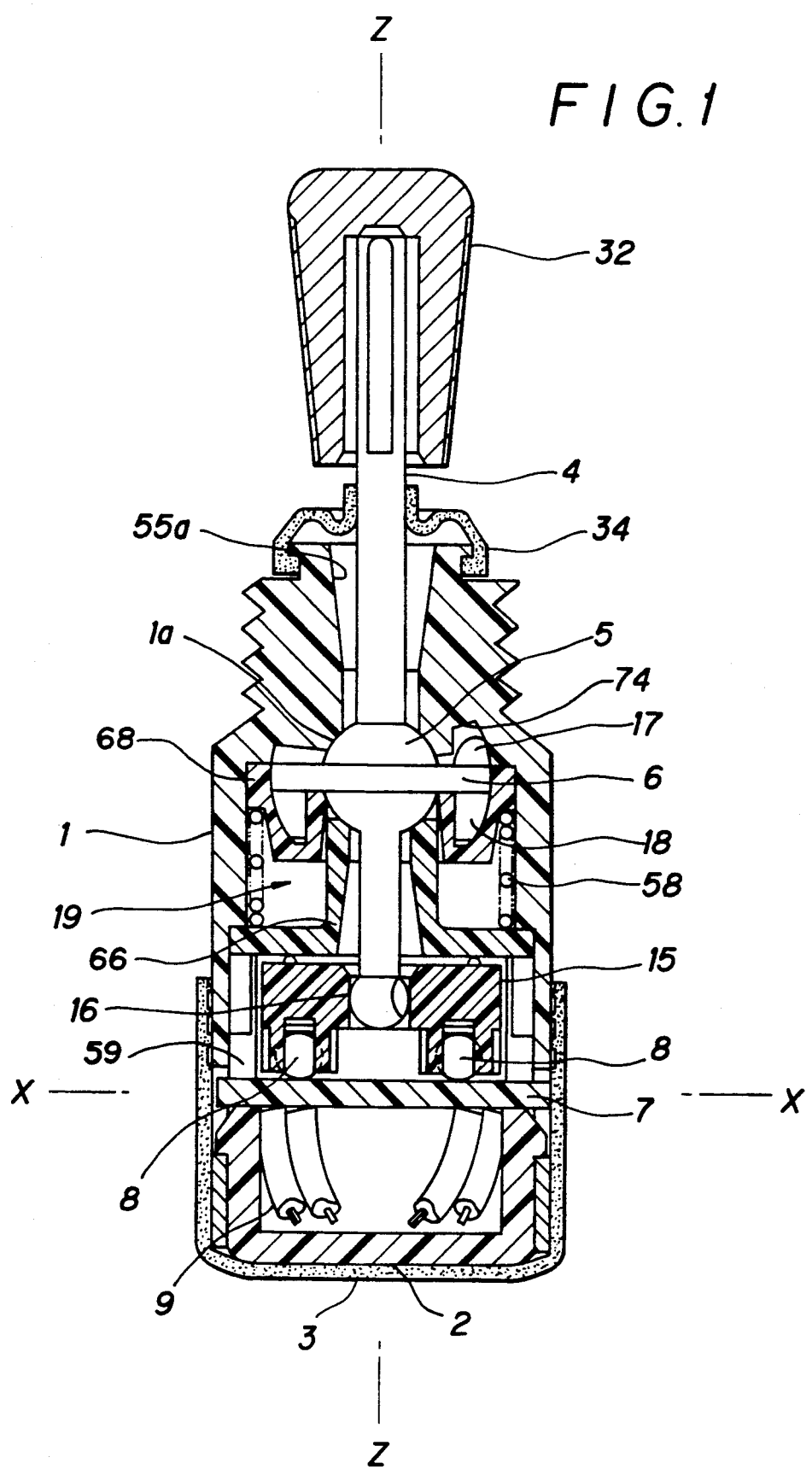
Figure 2:
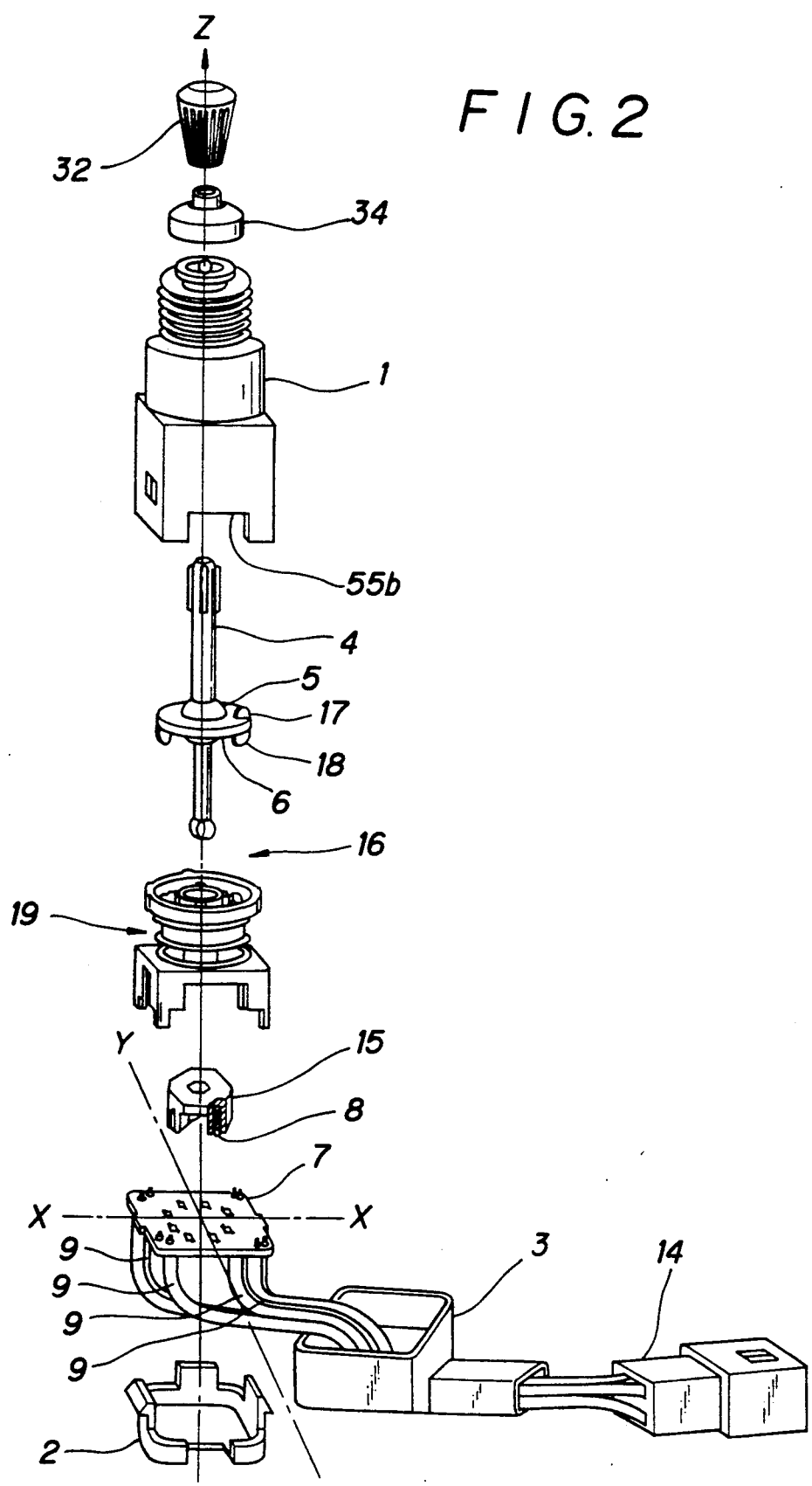
Figure 3:
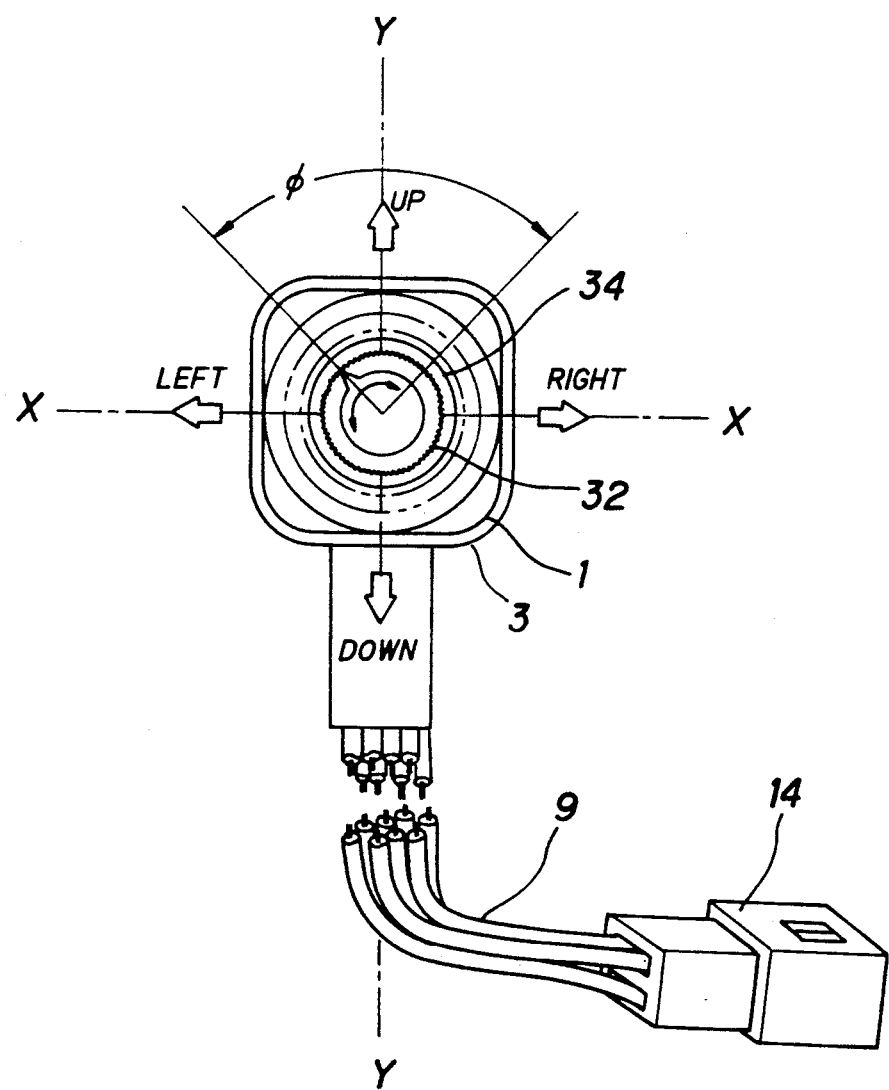

In FIG. 1, the reference numeral 1 indicates a casing having an upper opening 55a, through which one end of an operating shaft 4 is led out, and a lower opening 55b which is generally square. The operating shaft 4 has fixed at one end thereof an operating knob 32 which is to be manually turned and tilted. In the proximity of the lower opening 55b there is fixed to the casing a substrate 7 on which a switching circuit is formed, and a bottom cover 2 is fixed to the casing 1 in contact with the bottom side of the substrate 7. For preventing liquid from entering the casing 1, a rubber cap 34 is provided over the opening 55a formed in the casing 1. The rubber cap 34 is fixed to the casing 1 and fits on the operating shaft 4. As shown in FIG. 2, three coordinate axes X, Y and Z, each being perpendicular to one another, are assumed to lie on the substrate 7. The center of these axes is conveniently assumed to coincide with the center of the substrate 7. The operating shaft 4 has integrally formed on the shank thereof, a spheric portion 5 and flange 6. Thus, the operating shaft 4 is pivotably supported at the spheric portion 5 with respect to the casing 1. That is, it pivots about the Z-axis and is tiltable in the XZ plane (rightward and leftward tilting) and in the YZ plane (forward and backward or upward and downward tilting). In this context, the term "XY plane or YZ plane" means a plane nearly parallel to the XY coordinate plane (plane defined by the X- and Y-axes) or YZ coordinate plane (plane defined by the Y- and Z-axes). Also, the operating shaft 4 is resiliently forced by a coil spring so as to normally be directed in the direction of the Z-axis (neutral position) and is so restrained as to be pivotable about the Z-axis within a predetermined angular range. The operating shaft 4 thus disposed is connected by means of a coupling mechanism 16 to a rotary switching member 15 which is disposed on the substrate 7 and which is provided with four small electrically conductive balls 8 as moving contacts. There are formed on the substrate 7 plural fixed contacts, more particularly, 32 fixed contacts of which a certain one or plural ones forms or form a wiring pattern or patterns, respectively, on the substrate 7 and predetermined wiring patterns are electrically connected to each other. These wiring patterns are connected to a connector 14 with wires 9 for power supply to or energization of the four motors. The plurality of such fixed contacts are selectively connected to each other by means of the rotary switching member 15, having the four electrically conductive balls 8, which slides and rotates on the substrate 17 correspondingly to the rotation within a predetermined angular range, and the tilting in the rightward, leftward, forward or backward direction of the operating shaft 4.

Figure 10:
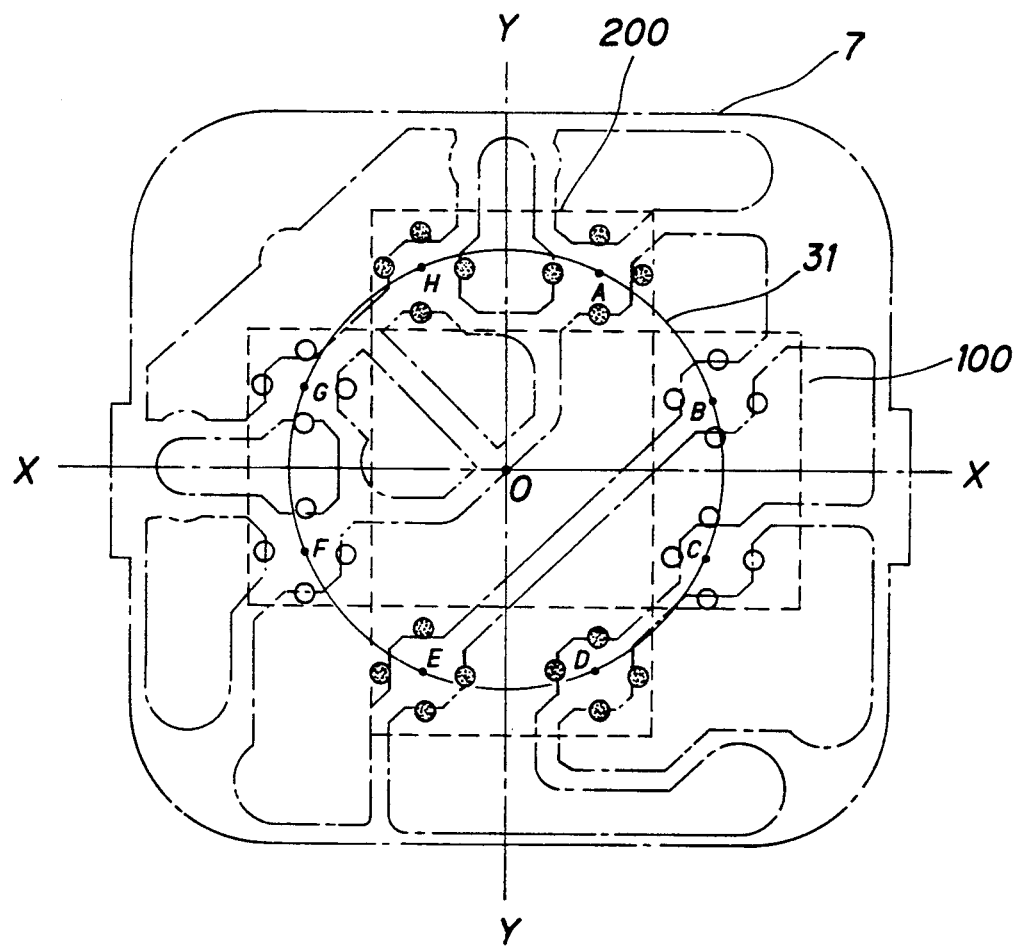

First, the layout of the fixed contact groups on the substrate 7 of the control switch according to the present invention will be described herebelow. It is assumed that a circle 31 having the center thereof at the intersection 0 between the X- and Y-axes lies on the substrate 7. This circle 31 is equidistantly divided by eight to make 8 points, A and B to H, along the circumference thereof as shown in FIG. 10. However, these 8 points, A and B to H, may not normally be those resulting from equidistant division of the circle 31, but they may be such that the points A, D, E and H form a rectangle circumscribed by the circle 31, and the four apices of the rectangle rotated about the center 0 through a predetermined angle, for example, 90 deg. counterclockwise be taken as points C, F, G and B, respectively. Four fixed contacts are disposed correspondingly to the the eight points A and B to H, respectively. Namely, fixed contacts Ad and Au are placed at points equidistant from the point A in the directions of +Y-axis and −Y-axis, respectively, and fixed contacts Al and Ar are placed at points equidistant from the point A in the directions of +X-axis and −X-axis, respectively. Thus the point A is associated with one set of fixed contacts including the four fixed contacts Ad, Au, Al and Ar equidistant from the point A in the upward, downward, rightward and leftward directions, respectively.

Similarly, sets of fixed contacts Bd, Bu, Br and Bl; Cd, Cu, Cr and Cl, Dd, Du, Dr and Dl; Ed, Eu, Er and El; Fd, Fu, Fr and Fl; Gd, Gu, Gr and Gl; and Hd, Hu, Hr and Hl, respectively. are disposed for the points B to H, respectively. As will be described later, the four sets of fixed contacts for the points B, C, F and G, respectively, form a first fixed contact group 100 associated with two motors M1 and M2 intended for control of the tilting of the mirror mounted at the left side of a car body, while the four sets of fixed contacts for the points A, D, E and H, respectively, form a second fixed contact group 200 associated with two motors M3 and M4 intended for control of the tilting of the mirror mounted at the right side of the car body.

Figure 11:
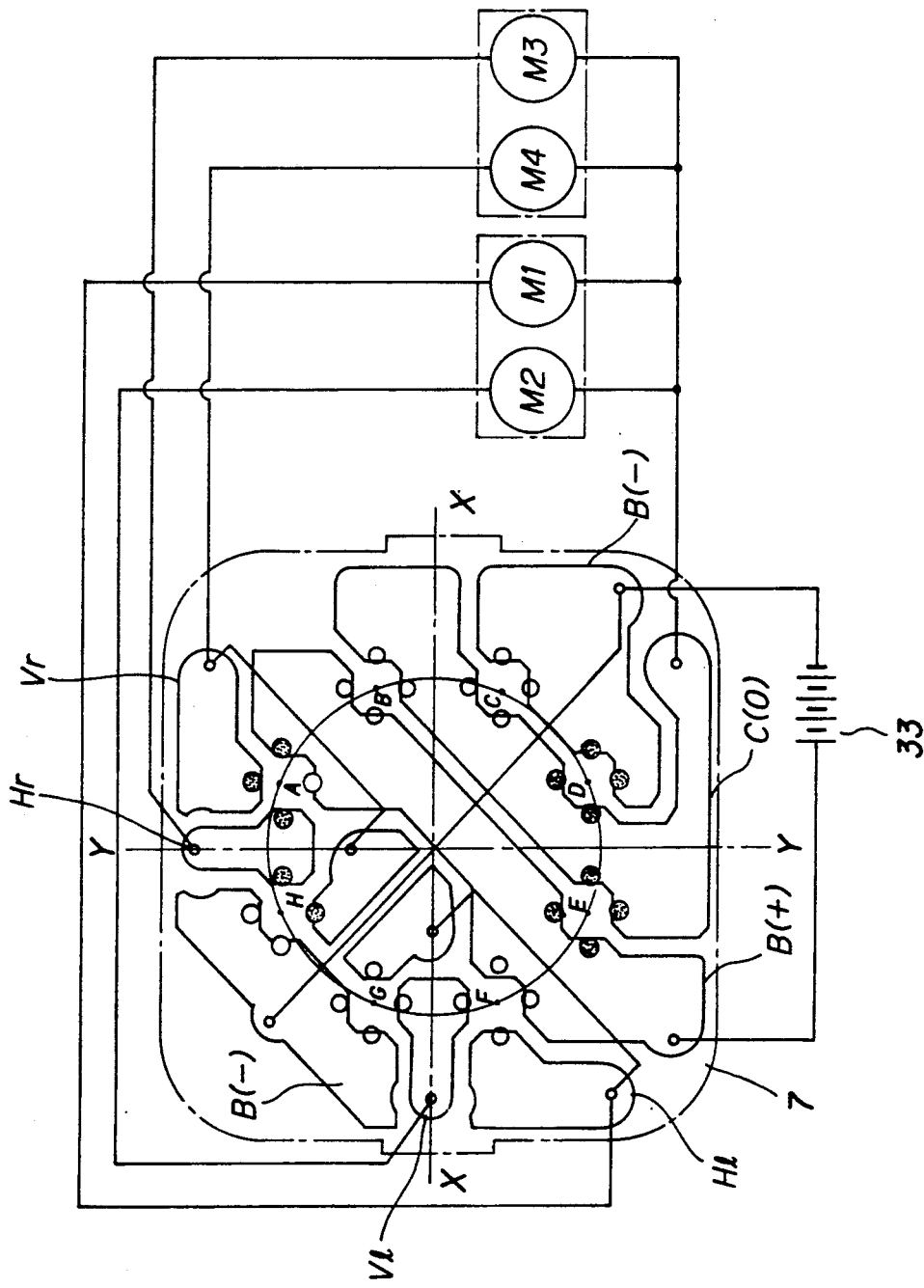

As shown in FIG. 11, the fixed contacts Al, Au, Bd, Br, Fl, Fu, Ed and Er are formed as a printed pattern, that is, a positive electrode pattern B(+) on the substrate 7. Similarly, the fixed contacts Hd, Hr, Gd, Gr, Cl, Cu, Dl and Du are formed as two negative electrode patterns B(−) between which the positive polarity pattern B(+) lies, the fixed contacts Cd, Cr, Dd, Dr, Bl, Bu, El and Eu are formed as a common electrode pattern C(0), the fixed contacts Fr and Gl are formed as two electrode patterns Hl, the fixed contacts Gu and Fd are formed as an electrode pattern Vl, the fixed contacts Ar and Hl are formed as an electrode pattern Hr, and the fixed contacts Ad and Hu are formed as two electrode patterns Vr.

The electrode patterns B(−), Hl and Vr formed with two spaced patterns may be formed as one electrode pattern on the substrate 7, but in this embodiment, they are electrically connected to one another on the rear side of the substrate 7, which effectively leads to a compact design of the substrate 7, that is, in compact design of the casing as the main body.

FIG. 11 shows the electrical connection between the above-mentioned fixed contact groups and the four motors for driving the two mirrors, right and left, that is, the electrical connection between the two motors M1 and M2 for tilting the lefthand mirror about the vertical and horizontal axes as well as that between the two motors M3 and M4 for tilting the righthand mirror about the vertical and horizontal axes.

The four motors are a DC motor reversible in revolving direction by reversing the direction of energization.

The positive electrode of a DC power source 33 is connected to the positive electrode pattern B(+) of the substrate 7 while the negative electrode is connected to the negative electrode pattern B(−). One of the terminals of each of the four motors M1, M2, M3 and M4 is connected to the common electrode pattern C(0). The other terminal of the motor M1 is connected to the electrode pattern Hl. Similarly, the other terminal of the motor 2 is connected to the electrode pattern Vl, that of the motor M3 is connected to the electrode pattern Hr, and that of the motor M4 is connected to the electrode pattern Vr.

The first and second fixed contact groups 100 and 200 form together with the motors M1, M2 and M3, M4 switching circuits, respectively. the fixed contacts forming the first and second groups 100 and 200, respectively, are selectively connected as the rotary switching member 15 having four small electrically conductive balls 8 slides on the substrate 7. The positional relation among the four electrically conductive balls, that is, four moving contacts 8, remains unchanged and the moving contacts 8 are disposed as spaced from each other at the four apices, respectively, of a rectangle defined by the points A, D, E and H. The moving contacts 8, one pair corresponding to the points A and H and the other pair corresponding to the points D and E are electrically connected to the respective fixed contacts by means of two electrically conductive plates 36 which are disposed on the rotary switching member 15. More specifically, the rotary switching member 15 comprises a moving body 35 made of an electrically insulative synthetic resin and which has four concavities 38 for receiving the four electrically conductive balls 8, respectively. Each of these concavities 38 has a coil spring 37 provided therein. The two electrically conductive plates 36 provide an electrical connection between the moving contacts 8 in one pair corresponding to the points A and H, respectively, as well as between the moving contacts 8 in the other pair corresponding to the points D and E, respectively. The moving contacts 8 are forced toward the substrate 7 with the resilience of the respective coil springs 37. The opening of each concavity 38 is formed so as to have a slightly smaller diameter than that of each electrically conductive ball 8 and is flexible so as to permit the insertion of the ball 8 when the latter is pushed with the fingertip. The resilience of the coil spring 37 is selected so that it cannot force out the ball 8 once it is received in the concavity 38.

The moving body 35, forming the main body of the rotary switching member 15, the four electrically conductive balls 8, the two electrically conductive plates 36 and the four coil springs 37 form a subassembly.

The rotary switching member 15 subassembly is arranged with the four electrically conductive balls 8 directed toward the substrate 7 and is driven by means of the operating shaft 4. The operating shaft 4 is pivoted about the z-axis and tilted in the XZ and YZ planes by manually rotating or tilting the operating knob 32, and the pivoting and tilting are transmitted to the rotary switching member 15 by means of the coupling mechanism 16.

Figure 9:
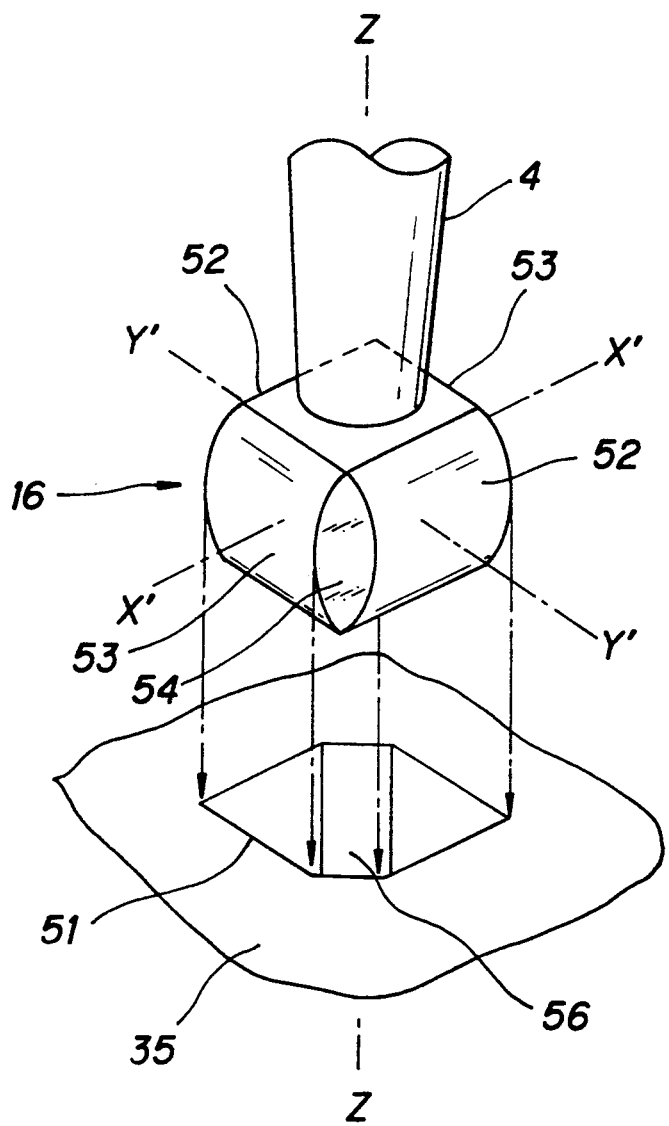

The coupling mechanism 16 will be explained with reference to FIG. 9. In FIG. 9, the lower end portion of the operating shaft 4 is shown as enlarged in scale. At the lower end portion of the operating shaft 4, a part of a cylindrical surface 52 lying in the XZ plane and taking as center axis a straight line X' parallel to the X-axis is formed at either of the two places corresponding to the tilting directions of the operating shaft 4 in the YZ plane, while a part of a cylindrical surface 53 lying in the YZ plane and taking as center axis a straight line Y' parallel to the Y-axis is formed at either of the two places corresponding to the tilting directions of the operating shaft 4 in the XZ plane. At the boundary between the cylindrical surfaces 52 and 53 adjoining each other, a flat face 54 is formed at either of the two places opposite to each other extending nearly parallel to the Z-axis.

Further, at the upper central portion of the moving body 35 forming the main body of the rotary switching member 15, there are provided two inner vertical walls receiving the cylindrical surfaces 52 and 53, respectively, formed on the lower end portion of the operating shaft 4, and a concavity, that is, a hole 51, having two inner vertical walls 56 receiving the flat faces 54, respectively, formed at the lower end portion of the operating shaft 4. As the operating shaft 4 is tilted in the YZ plane, the rotary switching member 15 is slid in the direction Y'—Y'. When the operating shaft 4 is tilted in the XZ plane, the rotary switching member 15 is slid in the direction X'—X'. Because of the structure in which the flat faces 54, formed at the lower end portion of the operating shaft 4, are engaged on the inner vertical walls 56, formed in the hole 51 corresponding to the flat faces 54, as the operating shaft 4 is pivoted about the Z-axis, the rotary switching member 15 is also pivoted therewith. In this embodiment, the lower end portion of the operating shaft 4 is formed to have a combination of the parts of cylindrical surfaces and the flat faces corresponding to the rightward, leftward, forward and backward tilting directions of the operating shaft 4. However, a combination of any other curved surfaces other than the cylindrical ones and the flat faces may be so formed on the lower end portion of the operating shaft 4 so that they are in linear contact with the inner vertical walls of the hole 51 formed in the rotary switching member 15.

Figure 4:
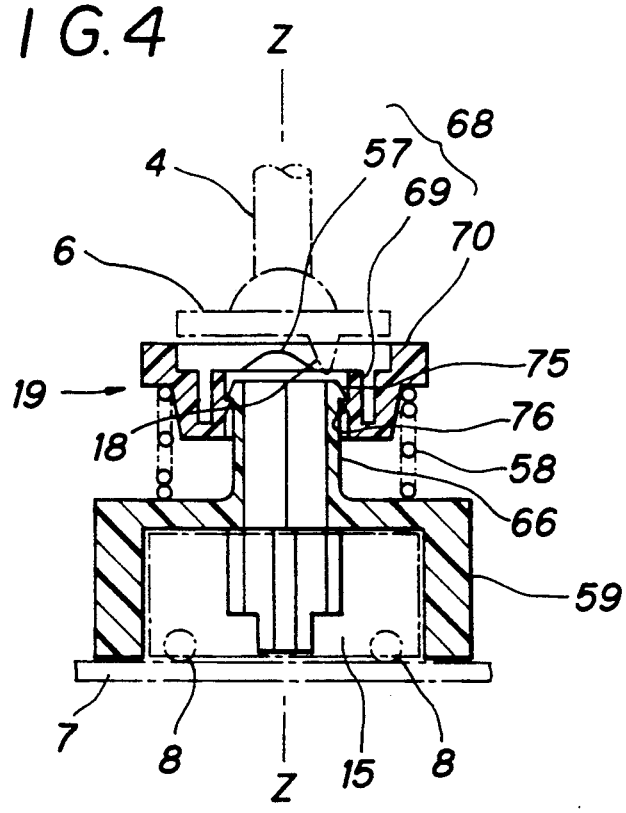
Figure 5:
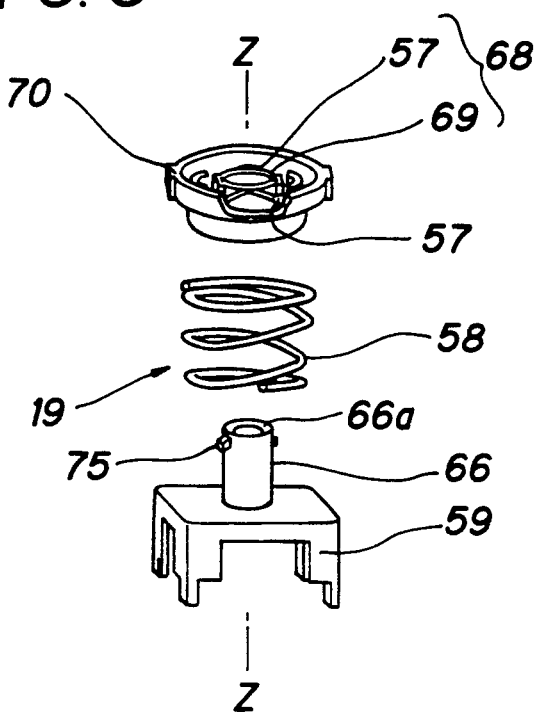
Figure 6:
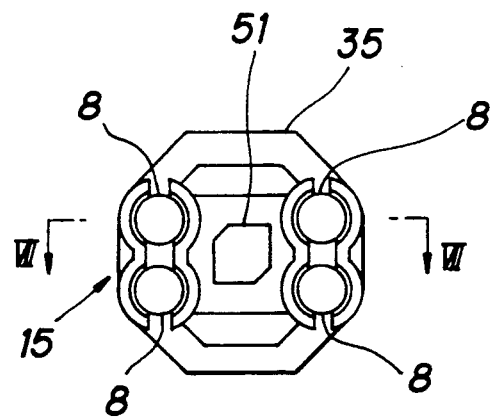
Figure 7:
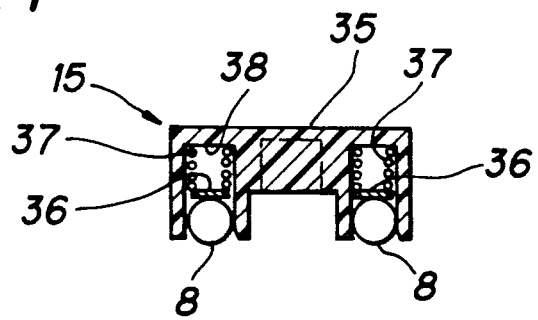
Figure 8:
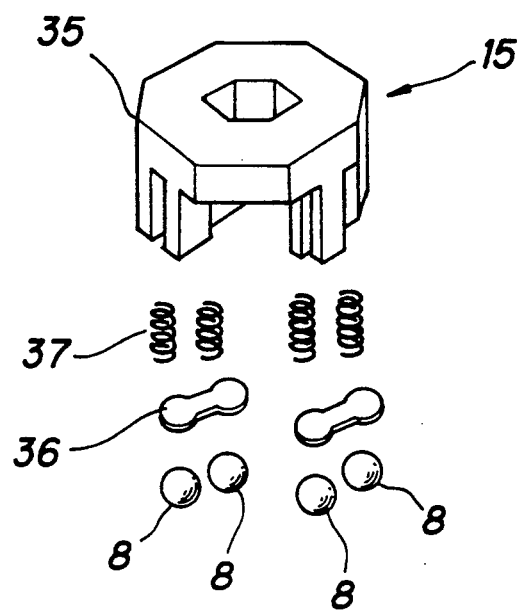

The posture controller 19 comprising a resilient means normally acting upon the operating shaft 4 which in turn will take a neutral position where its axial direction is nearly coincident with a direction perpendicular to the substrate 7 will be explained herebelow. The reference numeral 59 indicates a first table-like holding member having four legs. This holding member 59 is provided with a cylindrical portion 66 extending from the upper central portion thereof in the direction of Z-axis. The cylindrical portion 66 has formed at the upper end portion thereof a seat 66a receiving the lower semispheric portion of the spheric portion 5 of the operating shaft 4, and a pair of engagement protrusions 75 in diametrical positions on the outer circumference in the proximity of the upper end portion, as shown in FIG. 5. The first holding member 59 is fixed to the casing 1 as in contact at the upper edge thereof with a stepped portion formed on the inner wall of the casing 1 and at the four legs thereof with the substrate 7. The reference numeral 68 indicates a second holding member having another cylindrical portion 69 disposed tiltably with respect to the cylindrical portion 66 of the first holding member 59 and a cam face 57 on which a pair of protrusions 18 formed on the bottom face of the flange 6 of the operating shaft 4 while being in contact therewith. There is disposed between the first and second holding members 59 and 68 a compression spring 58 which forces the second holding member 68 in a direction away from the substrate 7. There is formed on the inner circumference of the cylindrical portion 69 a pair of engagement protrusions 76 which engage the engagement protrusions 75, respectively, of the cylindrical portion 66 under the resilience of the compression spring 58. The rotary switching member 15 is so arranged as to be slidable on the substrate 7 within a space defined by the four legs of the first holding member 59, and it is also forced toward the substrate 7 by the resilience of the compression springs 37 provided within the concavities 38 so that an appropriate contact can be maintained between the four electrically conductive balls 8 and the substrate 7. On the other hand, there is provided a slight clearance between the inner circumference of the cylindrical portion 69 and the outer circumference of the cylindrical portion 66, as shown in FIGS. 1 and 4, such that the second holding member 68 is tiltable with respect to the first holding member 59. The profile of the cam face 57 of the second holding member 68 comprises a pair of convex surfaces formed at positions about 180 deg. offset from each other corresponding to the pivoting orbit about the Z-axis of the pair of protrusions 18 of the operating shaft 4, as shown in FIG. 4. When the operating shaft 4 is in a position for controlling the tilting of either the righthand or lefthand mirror, the pair of protrusions 18 lie on the lowest portions, respectively, of the convex surfaces. The second holding member 68 is forced in the vertically upward direction, that is, in the direction of +Z-axis by means of the compression coil 58. In this condition, the second holding member 68 is put into contact with the inner wall of the casing 1, and the flange 6 of the operating shaft 4 is applied with a limited resilience of the compression coil 58. Hence, as shown in FIG. 1, the upper semispheric portion of the spheric portion 5 of the operating shaft 4 is forced to the concave seat 1a formed at the lower portion of the inner wall of the casing 1 having the opening 55a formed atop thereof. The lower semispheric portion of the spheric portion 5 is supported on the seat 66a of the cylindrical portion 66, the operating shaft 4 keeping the neutral position in this condition.

Therefore, when the operating shaft 4 is manually tilted leftward, rightward, forward or backward, the corresponding lower face of the flange 6 forces downward the second holding member 68 against the resilience of the compression spring 58 while the lower and upper semispheric portions of the spheric portion 5 are being caught by the seats 66a and 1a, respectively. As a result, the second holding member 68 is tilted with respect to the first holding member 59 corresponding to the tilting direction of the operating shaft 4. Thus, it will be apparent that when the manual operating force applied to the operating shaft 4 is released, the second holding member 68 is returned to its initial position by the resilience of the compression spring 58. That is the operating shaft 4 takes a neutral position where the direction of its axis is nearly coincident with a direction perpendicular to the substrate.

In this embodiment, a counterclockwise or clockwise rotation through 90 deg. of the operating shaft about the X-axis leads to a switching from a position for controlling the righthand or lefthand mirror to a position for controlling the lefthand or righthand mirror. As shown in FIG. 1, the protrusion 17 formed on top on the flange 16 of the operating shaft 4 is so arranged as to be guided in a recess 74 formed in the inner wall of the casing 1 within a range of 90 deg. along a circular arc about the Z-axis. This limits to 90 deg. the pivoting angle of the operating shaft 4 about the Z-axis. Also, when the operating shaft 4 is rotated about the Z-axis, the protrusion 18 rides on the apex of the convex surface from the lowest portion of the convex surface of the cam face 57 against the resilience of the compression spring 58, and thereafter the protrusion slides down to the lowest portion of the convex surface. Thus, the operating shaft 4 clicks during pivoting about the Z-axis.

Also in the embodiment, a subassembly consists of the moving body 35 forming the main body of the rotary switching member 15, four electrically conductive balls 8, two electrically conductive plates 36 and four coil springs 37 while the first and second holding members 59 and 68 form together another subassembly with the coil spring 58 provided between them. Thus, the whole control switch can easily be assembled.

Next, switching corresponding to the pivoting about the Z-axis or the rightward, leftward, forward or backward tilting of the operating shaft 4 will be explained herebelow. When the operating shaft 4 has been pivoted about the Z-axis to a position for controlling the tilting of the lefthand mirror, the positions of the four moving contacts 8 held on the rotary switching member 15 correspond to the positions of the points B, C, F and G, respectively. Namely, the operating shaft 4 lies in the neutral position where the moving contacts are not in contact with the electrode patterns. In this condition, when the operating shaft 4 is rotated clockwise to change the pivoting position to a position for controlling the tilting of the righthand mirror, that is, when the rotary switching member 15 is rotated through 90 deg. clockwise, the four moving contacts 8 are positioned at the four apices, respectively, of a rectangle defined by the points A, H, D and E. Even in this condition, the four moving contacts 8 are in their neutral positions where they are not in contact with the electrode patterns.

Figure 12:
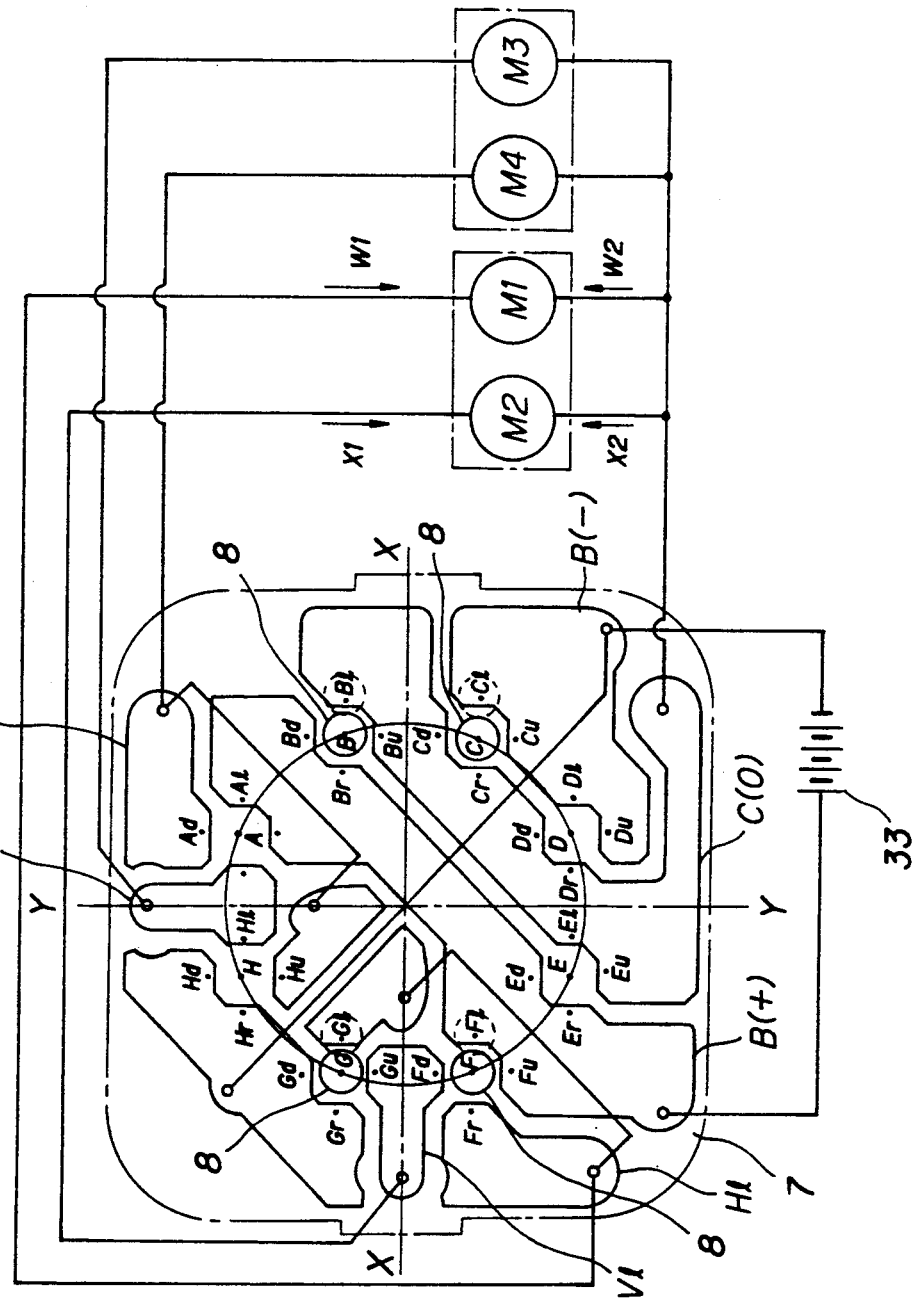

In the condition shown in FIG. 12, when the operating knob 32 of the operating shaft 4 is manually tilted leftward, the rotary switching member 15 is moved rightward, so the four moving contacts 8 are moved rightward to the positions indicated by dottedlines. Namely, the moving contact 8 positioned at the point B is placed in contact with the fixed contact C1, the moving contact 8 at the point F is in contact with the fixed point F1, and the moving contact 8 at the point G is in contact with the fixed contact G1. As a result, the fixed contacts G1 and F1 are electrically connected to each other, while the fixed contacts B1 and C1 are with each other. Such condition of energization is shown in the highest line in FIG. 14. Thus, the positive electrode pattern B(+) and electrode pattern H1 are electrically connected to each other, while the common electrode pattern C(0) and negative electrode pattern B(−) are electrically connected to each other. Thus, the positive electrode of the DC power source 33, positive electrode pattern B(+), electrode pattern H1, motor M1, common electrode pattern C(0) and the negative electrode of the DC power source 33 together form a closed circuit in which the current flows in the direction of arrow W1, so that the motor M1 revolves to tilt the lefthand mirror leftward. When the operating knob 32 is released, the moving contacts 8 return to their respective positions shown in FIG. 12 with the motor M1 stopped.

Also, when the operating knob 32 is tilted to the right from the position shown in FIG. 12, the rotary switching member 15 is moved to the left, the moving contacts 8 positioned at the points B, C, F and G, respectively, are put into contact with the fixed contacts Br, Cr, Fr and Gr, respectively, the motor M1 is supplied with the current in the direction of arrow W2 and revolves to tilt the lefthand mirror rightward.

As in the above, when the operating knob 32 of the operating shaft 4 is manually tilted upward or downward from the position shown in FIG. 12, the rotary switching member 15 is moved downward or upward on the substrate 7, the moving contacts 8 positioned at the points B, C, F and G are put into contact with the fixed contacts Bu, Cu, Fu and Gu or Bd, Cd, Fd and Gd, respectively, the motor M2 is supplied with the current in the direction of arrow x1 or x2 and revolves to tilt the lefthand mirror upward or downward.

Figure 13:
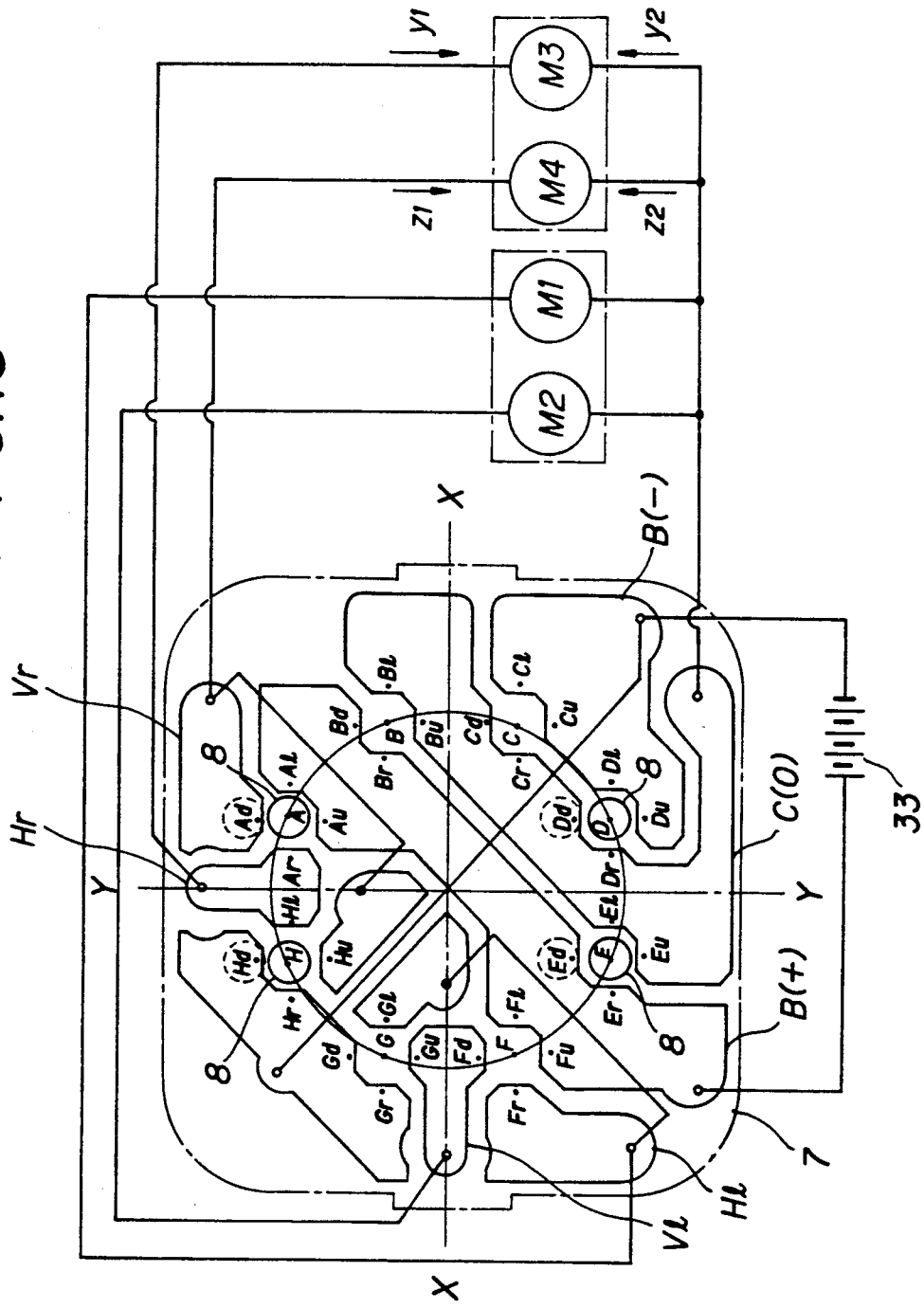

When the operating knob 32 of the operating shaft 4 is manually pivoted through 90 deg. clockwise, the rotary switching member 15 is also rotated through 90 deg. and the moving contacts 8 positioned at the points G, F, C and B, respectively, are moved to the points A, H, E and D, respectively, delineating a circular-arc orbit. FIG. 13 shows this condition.

During movement of the moving contacts 8, the moving contacts 8 positioned at the points B and C, respectively, pass by the negative electrode pattern B (−), with both the moving contacts being moved without contact with the positive electrode pattern B (+). Thus, there is no possibility of short-circuiting while the rotary switching member 15 is being pivoted.

When the operating knob 32 of the operating shaft 4 is manually tilted to the left or right from the condition shown in FIG. 13, the motor M3 is supplied with the current in the direction of arrow y1 or y2 and revolves to tilt the righthand mirror leftward or rightward. Similarly, when the operating knob 32 of the operating shaft 4 is manually tilted upward or downward, the motor M4 is supplied with the current in the direction of arrow z1 or z2 and revolves to tilt the righthand mirror upward or downward.

From the foregoing description, it will be apparent that with such pivoting operation of the operating shaft 4, the rotary switching member 15 is moved from the neutral position corresponding to the motors M1 and M2 for driving the lefthand mirror to the neutral position corresponding to the motors M3 and M4 for driving the righthand mirror. To tilt the selected mirror, the operating shaft 4 is moved in the rightward, leftward, upward or downward direction and, the tilting of the selected mirror about the vertical or horizontal axis of the mirror is accomplished.

FIGS. 15 to 19 show a second embodiment of the control switch according to the present invention. In FIGS. 15–19, the same or similar elements as those in the first embodiment are indicated with the same or similar reference numerals.

Figure 15:
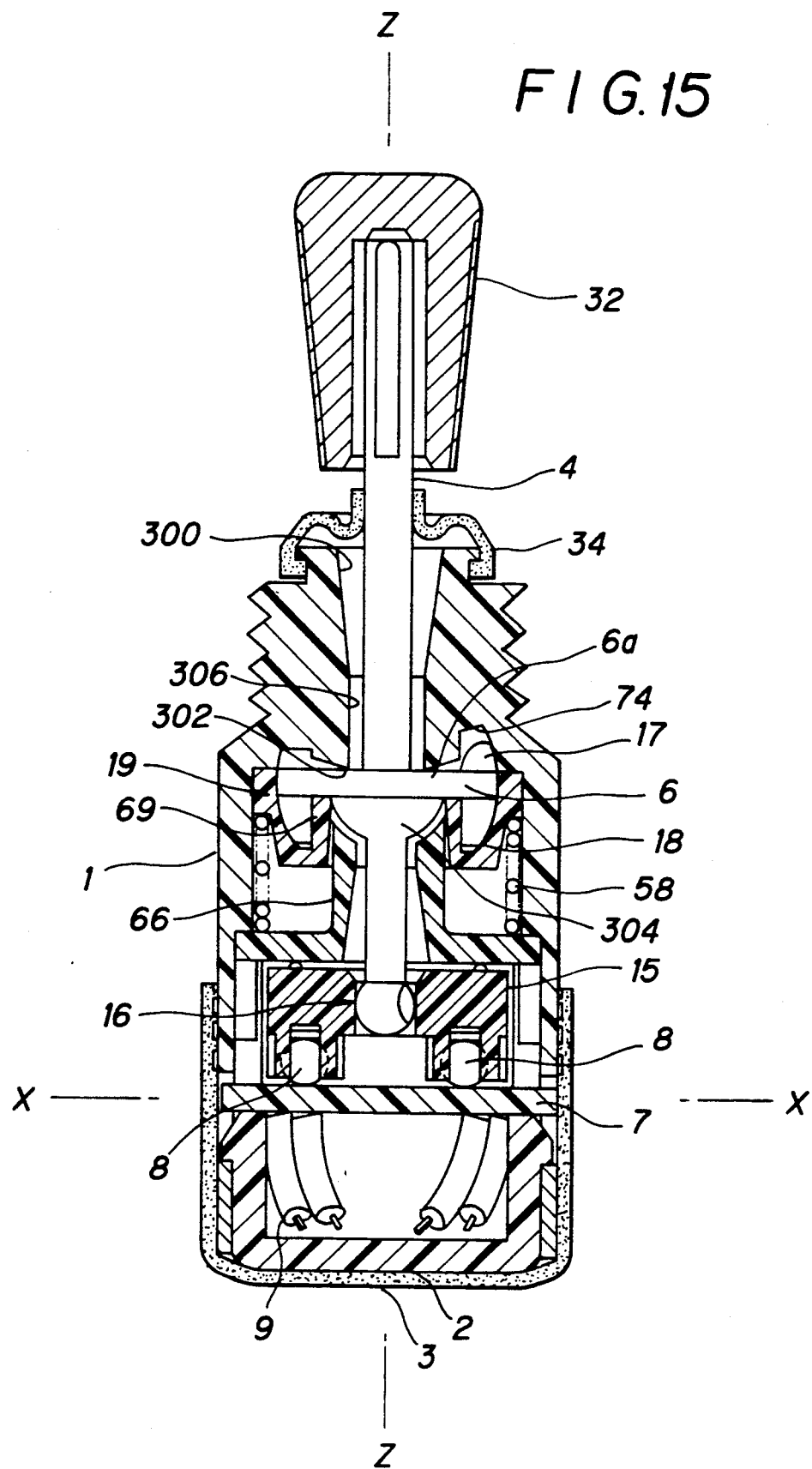
Figure 18:
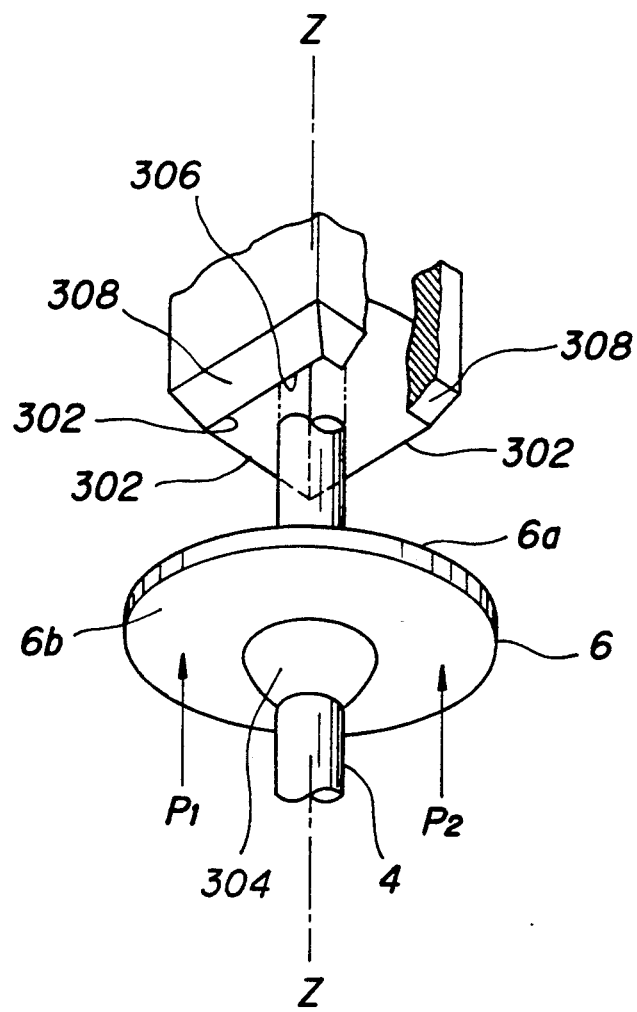

In the first embodiment, the lower and upper semispheric portions of the spheric portion 5 of the operating shaft 4 are caught by both the concave seats, namely, the seat 66a of the cylindrical portion 66 and the concave seat 1a formed at the lower portion of the inner wall of the casing 1 or top of which the upper opening 55a is formed. However, in the second embodiment, the operating shaft 4 has a flange 6 of which top 6a is flat as shown in FIG. 15 and received on the lower edge 302 of the inner wall of the casing defining the top opening 300 of the casing. Namely, the posture controller 19 has a different construction from that in the first embodiment. The lower semispheric portion 304 is not normally received in the cylindrical portion 66 of the first holding member 59 but it is received only when the operating shaft 4 is tilted. The bottom face of the flange 6 is supported on the top of the cylindrical portion 69 at a place further out in the radial direction than the lower semispheric portion 302. The second holding member 68 is forced away from the substrate 7 with the resilience of the compression spring 58, and the top 6a of the flange 6 is caught on the top of the cylindrical portion 69 of the second holding member 68 and the lower edge 302 of the casing 1. The posture controller 19 will be described in detail herebelow.

As shown in FIG. 15, the upper opening 300 of the casing 1 has the YZ section thereof shaped to be nearly square. The inner wall forming the upper opening 300 is shaped to be tapered toward the substrate 7 and gets nearer to the Z-axis so that the operating shaft 4 is tiltable in the rightward, leftward, upward and downward directions. The reference numeral 306 indicates a square hole extending from the upper opening 300. A square conical surface 308 is formed around the lower edge 302 of the square hole 306. The flange 6 of the operating shaft 4 is forced in the directions of arrows P1 and P2 with the resilience of the spring 58, and abuts at the top 6a thereof the four straight lower edges 302. Thus, the operating shaft 4 is forced by the spring 58 so that the axis thereof is directed toward the Z-axis.

When a force is applied to the operating knob 32 of the operating shaft 4 so that the latter is tilted in a desired direction, the operating shaft 4 is tilted about a linear contact between the flange 6 and one of the lower edges 302 and contacts one of the square conical surfaces 308. When the force is removed from the operating knob 32, the flange 6 is placed in linear contact with the four lower edges 302 so that it is positively returned in the direction of Z-axis to the neutral position and held there.

Figure 19:
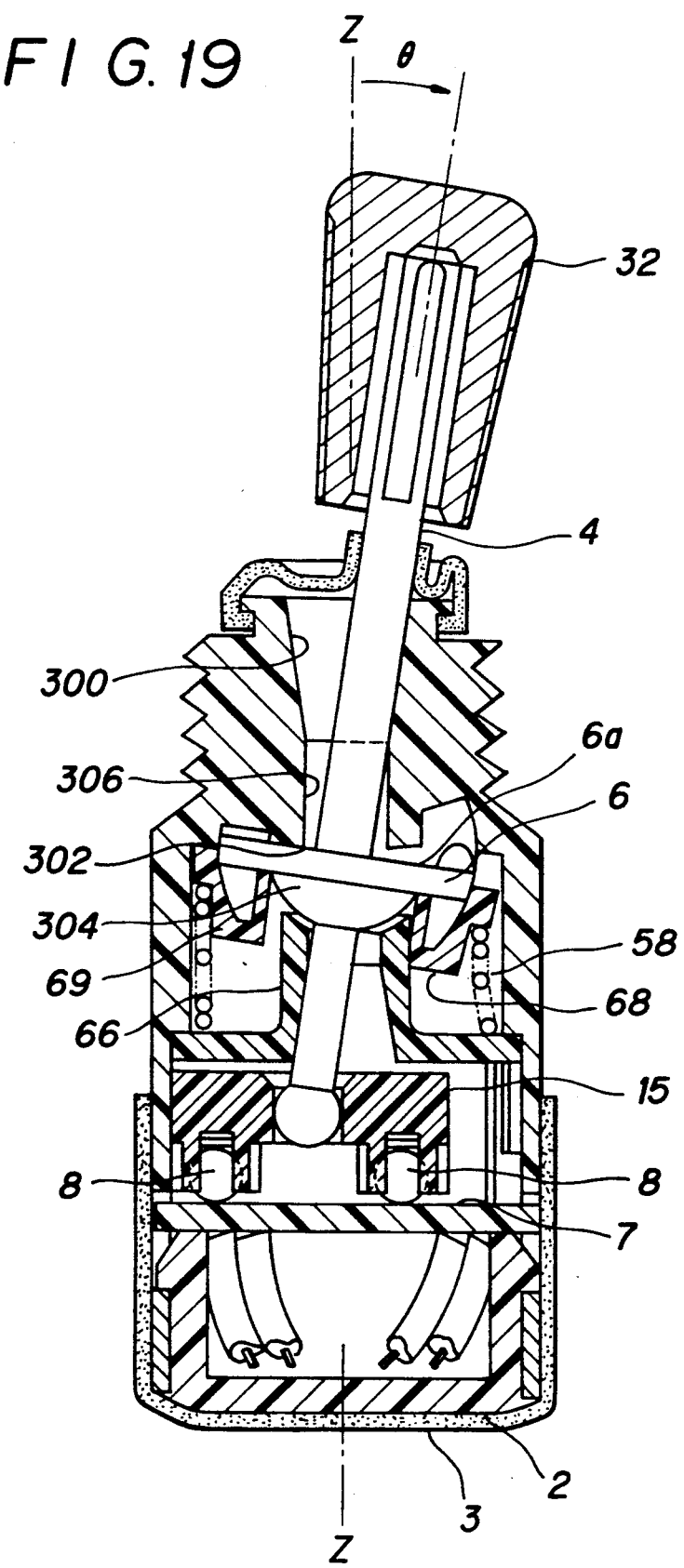

FIG. 19 shows a condition in which the operating shaft 4 is tilted with respect to the Z-axis. The top 6a of the flange 6 is tilted about one of the lower edges 302 and put in contact with one of the square conical surfaces 308. Such arrangement permits the tilting of operating shaft 4 and its return to the neutral position, both positively as compared with the well-known means such as ball joint or the like.

What is claimed is:

1. A switch for controlling forward and rearward movement of first and second pairs of DC motors, each of said pairs being used for tilting the mirror surface of one of two mirrors about the horizontal and vertical axes, said switch comprising:
   (a) a casing;
   (b) a substrate housed in said casing and having a surface;
   (c) first and second contact groups disposed on said surface of said substrate and being offset from one another by a predetermined angle, each of said first and second contact groups including sets of contacts controlling one pair of said first and second pairs of DC motors, each of said contact groups including first, second, third and fourth sets of contacts, each of said sets of contacts having four contacts;
   (d) a rotary switch member including
      first, second, third and fourth electrically conductive ball-like moving contacts, disposed in association with said first, second, third and fourth sets of contacts,
      first means for electrically connecting said first and second moving contacts to each other, second means for electrically connecting said third and fourth moving contacts to each other, means for holding said moving contacts such that said moving contacts roll on said substrate while retaining their positions relative to each other;

(e) an operating shaft supported on said casing, which is tiltable upward, downward, leftward, and rightward with respect to said casing and which is rotatable along said predetermined angle about an axis of said operating shaft, said operating shaft having a first end connected to said rotary switching member and having a second end disposed remote from said first end;

(f) a knob, provided on said second end of said operating shaft, for providing manual positioning of said operating shaft; and (g) a posture controller including resilient means for normally biasing said operating shaft into a neutral position in which said axis extends in a direction which is generally perpendicular to said surface of said substrate;

wherein, when said operating shaft lies in said neutral position, each of said moving contacts assumes a first neutral position between said contacts in a respective one of said sets of contacts of said first group, said moving contacts being movable to a second neutral position such that each of said moving contacts is disposed between said contacts in a respective one of said sets of contacts of said second group; and wherein, when said operating shaft is tilted in any of said upward, downward, leftward, or rightward directions, said movable contacts are moved in an opposite direction to that of the tilting direction of said operating shaft causing electrical connection to occur (1) between a respective one of said contacts of said first set of contacts and a respective one of said contacts of said second set of contacts and (2) between a respective one of said contacts of said third set of contacts and a respective one of said contacts of said fourth set of contacts, and, when said operating shaft is moved through said predetermined angle, each of said moving contacts moves from said first neutral position to said second neutral position.

2. A control switch according to claim 1, wherein said rotary switching member includes a moving body having concavities which open toward said substrate, each of said concavities receiving one of said electrically conductive ball-like moving contacts in a rolling manner; said first means for connecting being a first electrically conductive plate; said second means for connecting being a second electrically conductive plate; and said rotary switch having a coil spring means disposed therein for forcing said first and second electrically conductive plates toward said substrate.

3. A control switch according to claim 2, wherein the diameter of said concavities is slightly smaller than the diameter of each of said electrically conductive ball-like moving contacts to prevent each of said electrically conductive ball-like moving contacts from coming out of a respective one of said concavities.

4. A control switch according to claim 1, further comprising a coupling means for operatively connecting said first end of said operating shaft to said rotary switching member, said coupling means comprising two curved surfaces generally perpendicular to each other and two opposed flat faces, a first flat face being disposed between said curved surfaces, and wherein said rotary switch has a concavity therein defined by flat inner walls such that said coupling means is received in said rotary switch concavity and said curved and flat surfaces contact said flat inner walls.

5. A control switch according to claim 2, further comprising a coupling means for operatively connecting said first end of said operating shaft to said rotary switching member, said coupling means comprising two curved surfaces generally perpendicular to each other and two opposed flat faces, a first flat face being disposed between said curved surfaces, and wherein said rotary switch has a concavity therein defined by flat inner walls such that said coupling means is received in said rotary switch concavity and said curved and flat surfaces contact said flat inner walls.

6. A control switch according to claim 4, wherein each of said curved surfaces are part of a cylindrical surface, the center axes of said curved surfaces being perpendicular to one another.

7. A control switch according to claim 1, wherein said posture controller includes a flange portion formed integrally with said operating shaft and extending in a direction nearly perpendicular to the axial direction of said operating shaft, and a compression spring forcing said flange portion in a direction away from and generally perpendicular to said substrate surface.

8. A control switch according to claim 2, wherein said posture controller comprises a flange portion formed integrally with said operating shaft and extending in a direction nearly perpendicular to the axial direction of said operating shaft, and a compression spring forcing said flange portion in a direction away from and generally perpendicular to said substrate surface.

9. A control switch according to claim 8, wherein said casing has a generally square opening defined by a plurality of walls, through which said operating shaft extends, said flange portion abutting linear lower edges of said square opening walls.

10. A control switch according to claim 1, wherein said posture controller comprises a flange portion formed integrally with said operating shaft and extending in a direction generally perpendicular to the axial direction of said operating shaft; upper and lower semispheric portions formed integrally with said operating shaft between which said flange portion is disposed; a first holding member, having a concave seat to receive said lower semispheric portion, which is fixed with respect to said casing; a second holding member disposed tiltably with respect to said first holding member and being in contact at the bottom face thereof with said flange portion; a compression spring disposed between said first and second holding members and forcing said flange portion in a direction nearly perpendicular to and away from said substrate surface; and a concave seat formed on the inner wall of said casing for receiving said upper semispheric portion.

11. A control switch according to claim 1, wherein said casing has a generally square opening defined by a plurality of walls, through which said operating shaft extends; and said posture controller comprises a flange portion formed integrally with said operating shaft and extending in a direction nearly perpendicular to the axial direction of said operating shaft, a first holding member fixed with respect to said casing, a second holding member disposed tiltably with respect to said first holding member and being in contact at the bottom face thereof with said flange portion, a compression spring disposed between said first and second holding members and forcing said flange portion in a direction generally perpendicular to and away from said substrate surface, and a linear seat formed on the lower edge of said square opening walls which receives said flange portion.

* * * * *